United States Patent [19]
Wilhelmi

[11] 3,987,321
[45] Oct. 19, 1976

[54] LINEAR INDUCTION CONVERTERS

[76] Inventor: Jose Roman Wilhelmi, General Pardinas No. 72, Madrid 6, Spain

[22] Filed: May 7, 1973

[21] Appl. No.: 357,625

[30] Foreign Application Priority Data
May 13, 1972 Spain .................................. 402744

[52] U.S. Cl. .................................. 310/13; 318/135
[51] Int. Cl.² ........................................ H02K 41/02
[58] Field of Search ................ 310/12, 13; 318/135

[56] References Cited
UNITED STATES PATENTS

| | | | |
|---|---|---|---|
| 782,312 | 2/1905 | Zehden | 310/13 |
| 2,931,963 | 4/1960 | Wilson | 310/13 X |
| 2,964,260 | 12/1960 | Edelman et al. | 310/13 X |

*Primary Examiner*—Gerald Goldberg
*Attorney, Agent, or Firm*—Hubbell, Cohen, Stiefel & Gross

[57] ABSTRACT

An improved linear induction converter, also commonly referred to as a linear asynchronous machine, comprising two parallelepipedal magnetic cores which are disposed parallel to each other leaving a small gap wherein a conductor element is lodged, said magnetic cores being provided with two multiphase windings such that the number of wave lengths of each winding is an integer, different for each winding, and the two electric field waves moving at different speeds are always in phase at the center of the converter and in phase opposition at the ends.

7 Claims, 3 Drawing Figures

LINEAR INDUCTION CONVERTERS

The present invention is an improvement in linear asynchronous machines also called linear induction converters.

The linear asynchronous machines are at present being fully researched, and it may be predicted that with their development an important technological advance will take place. Such machines consist essentially of two parallelepipedal magnetic cores, disposed parallel to each other, leaving between them a small gap.

On the faces of the cores, which delimit the gap, identical three-phase windings are disposed, lodged in grooves formed in said faces in a manner entirely analogous to that of the conventional rotary machines.

When these windings are connected to the three-phase network, a magnetic field forms in the gap having the form of a sinusoidal wave which advances at the velocity of synchronism:

$f$ = frequency of the current
$V_s = f \times \lambda$
$\lambda$ = wave length of the winding If one places in the gap a conductor element movable relative to the magnetic cores, currents are induced therein which are the cause of a transfer of energy between it and the windings.

If the speed of the conductor is less than $V_s$, the energy passes from the windings to the conductor (operating as a motor), while if it is greater, the transfer takes place in an inverse sense (operating as a generator).

In the practice, the applications of this machine correspond mainly to two different cases:

a. Linear motor for electric traction, for example, in railroads. In this case the conductor situated in the gap may be a thin metal plate situated in the center of the track, while the magnetic cores with the windings would be integral with the locomotive.

b. Magnetohydrodynamic induction generator. The conductor is a liquid metal (lithium, sodium, sodiumpotassium eutectic mixture, etc.) which circulates through a rectangular tube, at a speed greater than $V_s$, delivering the part of its energy to the windings.

Naturally, in both cases there exists the possibility of inverse operation (generator and pump, respectively), simply by changing the sign of the relative speed of the conductor with respect to the field.

The disadvantage of the linear asynchronous machine resides in that at its ends the electric field is not zero, giving rise to currents outside the body of the machine which, besides producing the consequent losses by Joule effect, return to the interior thereof, disturbing its operation.

To avoid this sharp decline in efficiency as well as the disequilibrium of the currents in the phases, it is proposed to use two windings of different wave lengths:

$$\lambda_m = \frac{2L}{m} \; ; \; \lambda_n = \frac{2L}{n} \; ; \; m \neq n$$

where $2L$ is the total length of the converter, $L/m$ and $L/n$ are the respective associated pole pitches, and $m$ and $n$ are any integer numbers.

As both windings do not mutually induce e.m.f., the whole functions as two ideal asynchronous machines connected in parallel.

The windings are arranged and connected so that the two electric field waves which they produce, by moving at different speeds, are always in phase at the center of the machine and in phase opposition at the ends, where we have at all times zero electric field; in this case the losses at the ends do not take place and the efficiency is raised considerably.

The advantages and details of the present invention will be seen more clearly in the detailed description made of an embodiment with reference to the annexed drawing, in which.

With reference to said figures, the linear asynchronous machine of the invention comprises, as do those of its type, two parallelepipedal magnetic cores 1, arranged parallel to each other, delimiting between them a small gap 2, of length $2a$.

On the faces of the cores which delimit the gap 2, there are arranged the three-phase windings lodged in grooves 3, formed in said faces in a manner entirely analogous to that of the conventional rotary machines.

In the gap is disposed a conductor 4, which may be either a thin plate or a tube of rectangular section through which a liquid metal is to circulate.

Figure 1:
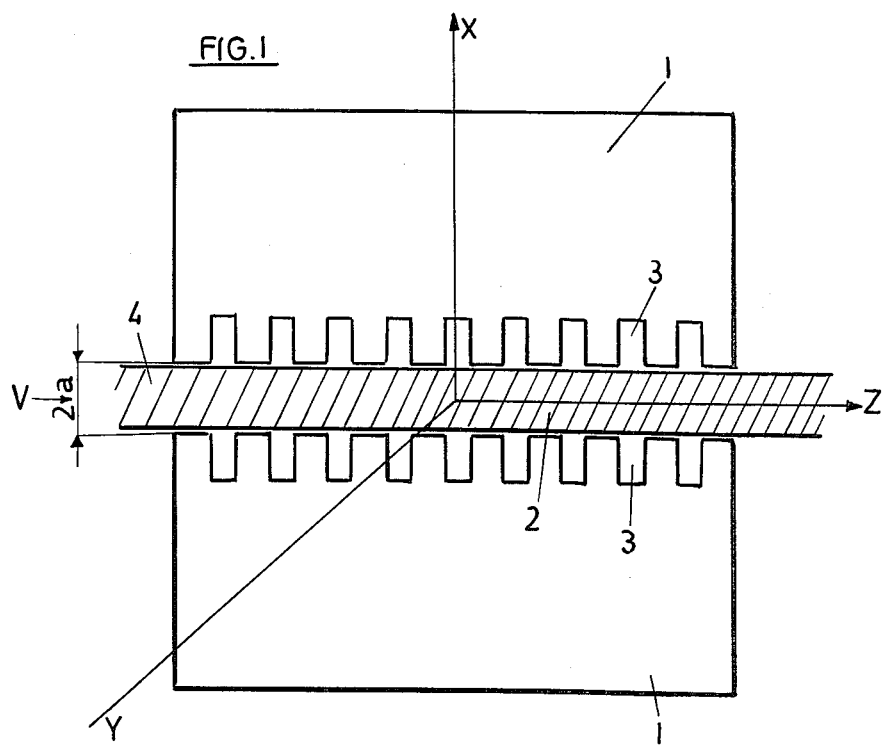
FIG. 1 is a schematic view of a linear asynchronous machine.
Figure 2:
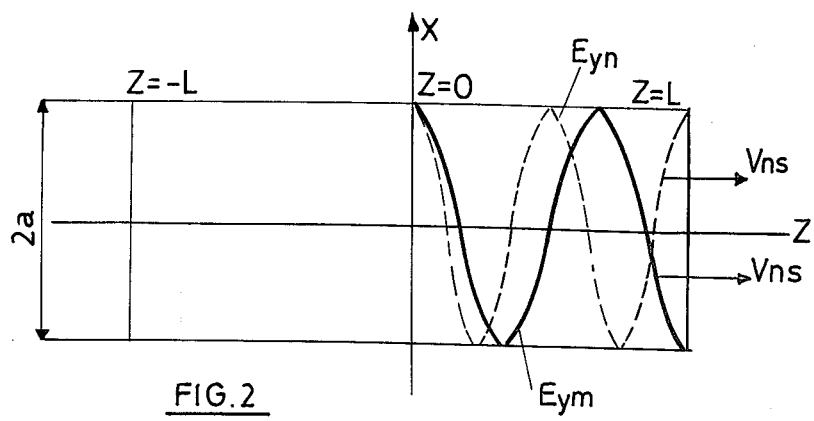
FIG. 2, is a graphic illustration representing the distribution of the waves of the electric field of the two windings.

In FIG. 2, the solid curves corresponds to $m = 3$, the one in broken lines to $n = 4$.

Leaving aside the harmonics, the number of conductors per unit length in each phase of the windings is, in general:

Winding $m$ $\qquad N_m{}^{(1)} = N_{om} \cos \left( \frac{m\pi}{L} Z + m \right)$ $\qquad \qquad N_m{}^{(2)} = N_{om} \cos \left( \frac{m\pi}{L} Z + \frac{4\pi}{3} + \alpha_m \right)$ $\qquad \qquad N_m{}^{(3)} = N_{om} \cos \left( \frac{m\pi}{L} Z + \frac{2\pi}{3} + \alpha_m \right)$ Winding $n$ $\qquad N_n{}^{(1)} = N_{on} \cos \left( \frac{n\pi}{L} Z + \alpha_n \right)$ $\qquad \qquad N_n{}^{(2)} = N_{on} \cos \left( \frac{n\pi}{L} Z + \frac{4\pi}{3} + \alpha_n \right)$ $\qquad \qquad N_n{}^{(3)} = N_{on} \cos \left( \frac{n\pi}{L} Z + \frac{2\pi}{3} + \alpha_n \right)$ where $N_{om}$ and $N_{on}$ are the maximum values of the number of conductors per unit length in each winding, and $\alpha_m$ and $\alpha_n$ the phase angles with which they are placed with respect to the center of the converter.

The electric field is found to be:

$$E = E_m \, e^{-j \frac{m\pi}{L} Z} + E_n \, e^{-j \frac{n\pi}{L} Z}$$

where $E_m$ and $E_n$ are the complex amplitudes of the electric field waves corresponding to each winding.

The e.m.f. induced in phase (1) of each winding is proportional to $N_{om} \, E_m \, e^{j \alpha m}$ and to $N_{on} \, E_n \, e^{j \alpha n}$, respectively, (in the other two phases, the results are analogous).

Let us consider the case that both are connected in parallel and are disposed so that:

$$N_{am} = N_{an}; \alpha_m = \alpha_n$$

In these conditions, if $n\text{-}m$ is odd, the two electric field waves moving at the speeds:

$$V_{xm} = f \times \lambda_m$$

$$V_{xn} = f \times \lambda_n$$

are always in phase at the center of the machine ($Z = 0$) and in phase opposition at the ends ($Z = \pm L$) where we have at all times zero electric field.

If $m\text{-}n$ is even, it suffices to make the connection in parallel, with the polarity of one winding inverted.

Figure 3:
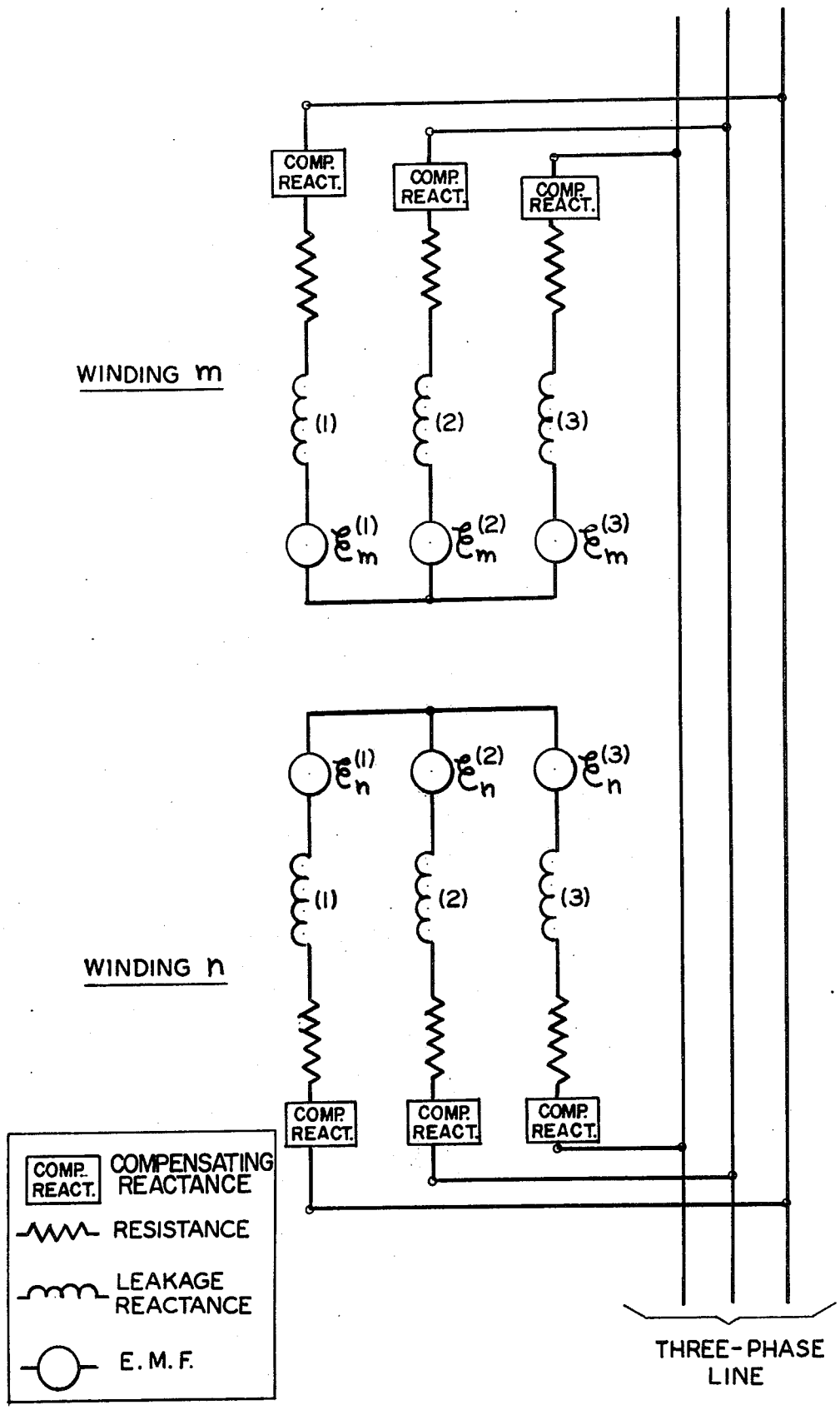
FIG. 3 is a schematic drawing of the machine of FIG. 1 showing a parallel connection of the windings.

In reality, with the parallel connection of both windings (FIG. 3) one does not exactly obtain equality of the e.m.f.'s (and hence of the amplitudes $E_m$ and $E_n$ of the electric field waves) but of the voltages at their terminals, which differ from those in the voltage drops in the windings.

The voltage drop due to resistance is very small, and that due to reactance is very easy to compensate, by introducing the proper reactances, which do not cause additional consumption of energy.

The nature of the invention having been sufficiently described, and how to carry it into effect, it should be noted that the above stated arrangements are susceptible of modifications or improvements of realization so long as their fundamental principle is not altered.

What is claimed is:

1. An improved linear induction converter comprising a pair of spaced apart parallelepipedal magnetic cores disposed parallel to each other to define a gap therebetween, a conductor element disposed in said gap, each of said cores being provided with a multiphase winding and having an associated pole pitch, each of said windings having an associated wavelength defined by twice the associated pole pitch of the core associated with said winding, each of said associated wavelengths being different for each winding and being defined by the expression $$\lambda_m = \frac{2L}{m}$$

for one winding and $$\lambda_n = \frac{2L}{n}$$

for the other winding where $$\frac{L}{m}$$

corresponds to the pole pitch for said one winding, $$\frac{L}{n}$$

corresponds to the pole pitch for said other winding, $m \neq n$, $2L$ equals the total length of said converter and $m$ and $n$ are integers, each of said windings producing an associated electric field wave in response to an electric current flowing therethrough, said field waves each moving at a different speed defined respectively by the relationships $V_{sm} = F \times \lambda_m$ for said one winding and $V_{sn} = F \times \lambda n$ for said other winding, where $V_{sm}$ and $V_{sn}$ equal the speed of said field wave in said one winding and said other winding respectively and F equals the frequency of said electric current, said m and n integers being selected to enable said two electric field waves to have associated speeds which enable said field waves to always be in phase at the center of said converter and in phase opposition at the ends of said converter, whereby the electric field associated with said converter is maximized at said center and zero at said ends.

2. An improved linear induction converter in accordance with claim 1 wherein said windings are connected in parallel and $n\text{-}m$ is odd.

3. An improved linear induction converter in accordance with claim 1 wherein $m\text{-}n$ is even and said windings are connected in parallel with the polarity of one winding inverted.

4. An improved linear induction converter in accordance with claim 1 wherein said windings are connected in parallel and at least one of said windings includes additional impedance means for compensating for any voltage drop occurring in said windings to maintain equality of the e.m.f.s. associated with each winding.

5. An improved linear induction converter in accordance with claim 4 wherein said additional impedance comprises capacitance means for compensating for any voltage drop caused by leakage reactance.

6. An improved linear induction converter in accordance with claim 1 wherein each of said windings comprises an equal density of conductors, whereby the associated amplitudes of the fundamental associated electric field waves of the Fourier series corresponding thereto are equal.

7. An improved linear induction converter in accordance with claim 1 wherein each of said multiphase windings has associated phase angles, said phase angles associated with each winding being equal with respect to the center of the converter.

* * * * *